(12) United States Patent
Hashimoto et al.

(10) Patent No.: US 11,091,680 B2
(45) Date of Patent: Aug. 17, 2021

(54) HEAT TRANSPORT FLUID AND HEAT TRANSPORT DEVICE USING THE SAME

(71) Applicant: KABUSHIKI KAISHA TOYOTA CHUO KENKYUSHO, Nagakute (JP)

(72) Inventors: Shunsuke Hashimoto, Nagakute (JP); Koichi Kurazono, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 8 days.

(21) Appl. No.: 15/836,983

(22) Filed: Dec. 11, 2017

(65) Prior Publication Data

US 2018/0163109 A1 Jun. 14, 2018

(30) Foreign Application Priority Data

Dec. 14, 2016 (JP) .............................. JP2016-242048
Nov. 9, 2017 (JP) .............................. JP2017-216657

(51) Int. Cl.
*F28F 23/00* (2006.01)
*C09K 5/10* (2006.01)
*F28D 15/00* (2006.01)
*C09K 5/14* (2006.01)

(52) U.S. Cl.
CPC ................. *C09K 5/10* (2013.01); *C09K 5/14* (2013.01); *F28D 15/00* (2013.01); *F28F 23/00* (2013.01)

(58) Field of Classification Search
CPC .............. C09K 5/10; F28F 23/00; F28F 23/02
See application file for complete search history.

(56) References Cited

U.S. PATENT DOCUMENTS

| 2005/0269548 A1* | 12/2005 | Jeffcoate | C09K 5/10 252/71 |
| 2006/0054564 A1* | 3/2006 | Woyciesjes | C09K 5/10 210/697 |
| 2009/0294102 A1* | 12/2009 | Yang | C09K 5/10 165/104.19 |
| 2013/0119302 A1 | 5/2013 | Huang et al. | |

FOREIGN PATENT DOCUMENTS

| JP | 2013-001728 A | 1/2013 |
| JP | 2013-028792 A | 2/2013 |
| JP | 2013-104059 A | 5/2013 |

OTHER PUBLICATIONS

Nikkam, Novel nanofluids based on mesoporous silica for enhanced heat transfer, 2011, Journal of Nanoparticle Research, 6201-6206 (Year: 2011).*
Solangi, A comprehensive review of thermo-physical properties and convective heat transfer to nanofluids, Energy (Year: 2015).*
Azmi, The enhancement of effective thermal conductivity and effective dynamic viscosity of nano fluids—A review, Renewable and Sustainable Energy Reviews (Year: 2016).*
Iranidokht, Thermal conductivity of mixed nanofluids under controlled pH conditions, International Journal of Thermal Sciences (Year: 2013).*

* cited by examiner

*Primary Examiner* — Eric S Ruppert
(74) *Attorney, Agent, or Firm* — Oliff PLC (57) ABSTRACT

A heat transport fluid includes a base fluid; and solid particles which are dispersed in the base fluid, have an average particle diameter of 200 to 400 nm, and have a potential difference of 35 mV or more from the base fluid, and a heat transport device uses the heat transport fluid.

11 Claims, 7 Drawing Sheets

HEAT TRANSPORT FLUID AND HEAT TRANSPORT DEVICE USING THE SAME

BACKGROUND OF THE INVENTION

Field of the Invention

The present invention relates to a heat transport fluid to be filled into a heat exchanger, and a heat transport device using the same.

Related Background Art

To improve the efficiency of thermal conduction in a heat exchanger, a heat transport fluid obtained by dispersing fine particles in a base fluid has been proposed as a heat transport fluid to be filled into a heat exchanger. For example, Japanese Patent Application Publication No. 2013-1728 (Patent Literature 1) describes a heat transport fluid including: a solvent made of water or an organic substance; a plurality of fine particles dispersed in the solvent; and a plurality of carbon nanotubes dispersed in the solvent, wherein the fine particles each have a polyhedron shape or the shape of konpeito (Japanese sugar candy balls with small bulges on their surfaces), and exemplarily shows particles having an average particle diameter in a range of 100 nm to 10 μm as the fine particles. In this heat transport fluid, the fine particles each having a polyhedron shape or the shape of konpeito are dispersed together with the carbon nanotubes to bring the carbon nanotubes in the fluid into a favorable dispersed state in terms of heat conduction, attempting to improve the thermal conductivity.

In addition, Japanese Patent Application Publication No. 2013-28792 (Patent Literature 2) describes a heat transport fluid including: a solvent made of water or an organic substance; and a plurality of fine particles dispersed in the solvent, wherein the fine particles each are sheet-shaped, and exemplarily shows particles having an average particle diameter in a range of 1 nm to 10 μm as the fine particles. In this heat transport fluid, the sheet-shaped fine particles are dispersed to bring the fine particles in the fluid into a favorable dispersed state in terms of heat conduction, attempting to improve the heat transfer.

Moreover, Japanese Patent Application Publication No. 2013-104059 (Patent Literature 3) describes an enhancing agent that is a composition of a nano powder and a micron powder and improves the efficiency of thermal conduction, and also states that the nano powder has a size range of 100 nanometers or less and the micron powder has a size range of 100 nanometers or more and 500 micrometers or less. In this enhancing agent, two types of powders having different size ranges are used together, attempting to improve the efficiency of thermal conduction.

SUMMARY OF THE INVENTION

However, the heat transport fluids described in Patent Literatures 1 and 2 as well as the enhancing agent described in Patent Literature 3 do not necessarily provide sufficient improvements in heat transfer efficiency, and there is a demand for a heat transport fluid having a higher heat transfer efficiency.

The present invention has been made in view of the problems of the above-described conventional techniques, and has an object to provide a heat transport fluid more excellent in heat transfer efficiency and a heat transport device using the same.

The present inventors have earnestly studied in order to achieve the above-described object. As a result, the present inventors found out that it is possible to improve the heat transfer efficiency by dispersing, in a base fluid, solid particles having a specific average particle diameter and having a specific potential difference from the base fluid. This finding has led to the completion of the present invention.

Specifically, a heat transport fluid of the present invention includes: a base fluid; and solid particles which are dispersed in the base fluid, have an average particle diameter of 200 to 400 nm, and have a potential difference of 35 mV or more from the base fluid.

In the heat transport fluid of the present invention, a content of the solid particles is preferably 1.0% by volume or more relative to the entire heat transport fluid, and a ratio of thermal conductivity of the heat transport fluid to that of the base fluid (heat transport fluid/base fluid) is preferably 1.096 or more.

In addition, a heat transport device of the present invention uses the above-described heat transport material of the present invention, and for example, includes: a circulation flow passage through which the heat transport fluid circulates; a pump which causes the heat transport fluid to flow through the circulation flow passage; a heat absorption portion which causes the heat transport fluid to absorb heat from an external high-temperature region; and a heat dissipation portion which dissipates heat from the heat transport fluid to an external low-temperature region.

According to the present invention, it is possible to obtain a heat transport fluid more excellent in heat transfer efficiency and a heat transport device using the same.

DETAILED DESCRIPTION OF THE PREFERRED EMBODIMENTS

Hereinafter, the present invention is described in detail with reference to preferred embodiments thereof.

First, a heat transport fluid of the present invention is described. The heat transport fluid of the present invention includes: a base fluid; and solid particles which are dispersed in the base fluid, have an average particle diameter of 200 to 400 nm, and have a potential difference of 35 mV or more from the base fluid.

The base fluid used in the present invention is not particularly limited, and includes for example water, antifreeze solutions (LLCs) such as an aqueous solution of ethylene glycol, an aqueous solution of propylene glycol, and the like.

In the heat transport fluid of the present invention, although the physical properties of the base fluid are not particularly limited, but usually, it is preferable to use a base fluid having physical properties including a specific gravity in a range of 1.00 to 1.09, a viscosity in a range of 0.001 to 0.007 Pa·s, a thermal conductivity in a range of 0.37 to 0.59 W/(m·K), and a specific heat in a range of 2.97 to 4.18 kJ/(kg·K) as the physical properties at room temperature (20° C.). In addition, if the viscosity of the base fluid is higher, it is more difficult to obtain a sufficient flow rate. Moreover, if the concentration of ethylene glycol, propylene glycol, or the like exceeds 70% by mass, the freezing temperature increases. Accordingly, it is necessary to appropriately adjust the concentration of ethylene glycol, propylene glycol, or the like such that the physical properties of the base fluid are within the above-described ranges.

The solid particles used in the present invention include particulate carbon materials such as graphite particles and diamond particles, metal oxide particles such as silica particles, zirconia particles, and alumina particles, ceramic particles, and metal particles such as copper particles, and the like. Among these solid particles, silica particles and zirconia particles are particularly preferable from the viewpoint that the heat transfer coefficient of the heat transport fluid can be easily improved.

In the heat transport fluid of the present invention, the solid particles have an average particle diameter of 200 to 400 nm and have a potential difference of 35 mV or more from the base fluid. Adding such solid particles to the base fluid improves the thermal conductivity and the heat transfer efficiency of the heat transport fluid. In addition, the solid particles having an average particle diameter in the above-described range are excellent in dispersion stability, and are thus unlikely to aggregate in the base fluid. Such solid particles are monodispersed even without using any dispersant, and are also excellent in handleability. On the other hand, if the solid particles have an average particle diameter of less than the above-described lower limit, the solid particles aggregate in the base fluid, and also the potential difference from the base fluid becomes less than the above-described lower limit. Even if such solid particles are added to the base fluid, the thermal conductivity and the heat transfer efficiency of the heat transport fluid are unlikely to be improved. On the other hand, if the solid particles having an average particle diameter higher than the above-described upper limit are added to the base fluid as well, the heat transfer efficiency of the heat transport fluid is unlikely to be improved. In addition, the potential difference of the solid particles from the base fluid is preferably 40 mV or more from the viewpoint that the heat transfer coefficient of the heat transport fluid is further improved. Note that the potential difference of the solid particles from the base fluid can be obtained by measuring the zeta potential of the solid particles in the base fluid. Moreover, the potential difference from the base fluid (the absolute value of the zeta potential) can be controlled by adjusting the pH value of the base fluid. Specifically, when the pH value of the base fluid is increased, the potential difference from the base fluid (the absolute value of the zeta potential) increases. In addition, the upper limit for the potential difference of the solid particles from the base fluid is not particularly limited.

In the heat transport fluid of the present invention, the true density of the solid particles is not particularly limited, but preferably has a small difference from the density of the base fluid from the viewpoint of favorably dispersing the solid particles in the base fluid without precipitation of the solid particles, and more preferably the difference from the density of the base fluid is 1500 kg/m$^3$ or less. In addition, the specific heat of the solid particles is not particularly limited, but is preferably 0.3 kJ/(kg·K) or more, and more preferably 0.5 kJ/(kg·K) or more, from the viewpoint of increasing the sensible heat of the base fluid to increase the amount of heat transported.

In addition, in the heat transport fluid of the present invention, the content of such solid particles is not particularly limited, but is preferably 1.0% by volume or more, more preferably 2.0% by volume or more, further preferably 3.0% by volume or more, and particularly preferably 3.5% by volume or more, relative to the entire heat transport fluid. In the heat transport fluid of the present invention, since the pressure loss is unlikely to increase during flow, such a relatively large amount of the solid particle can be added. When the content of the solid particle is in the above-described range, a heat transport material having a high heat transfer efficiency can be obtained. On the other hand, if the content of the solid particles is less than the lower limit, the heat transfer efficiency of the heat transport fluid tends to decrease. In addition, the upper limit for the content of the solid particles is not particularly limited, but is preferably 10.0% by volume or less, and more preferably 5.0% by volume or less, from the viewpoint of suppressing increase of the pressure loss during flow, and obtaining a sufficient fluidity of the heat transport fluid.

In the heat transport fluid of the present invention, a surfactant may be added in order to obtain a sufficient fluidity. This allows a larger amount of the solid particles to be added to the base fluid, thus making it possible to further improve the thermal conductivity and the heat transfer efficiency of the heat transport fluid. In addition, in the heat transport fluid of the present invention, conventionally known various additives such as an anti-rust agent and an anti-foaming agent may be added as long as such addition does not impair the effects of the present invention.

Next, the heat transport device of the present invention is described. Hereinafter, a preferred embodiment of the heat transport device of the present invention is described in detail with reference to the drawing; however, the heat transport device of the present invention is not limited to that shown in the drawing. Note that in the following description and the drawing, the same or corresponding elements are denoted by the same reference signs, and overlapping descriptions are sometimes omitted.

The heat transport device of the present invention uses the heat transport fluid of the present invention described above. Any conventionally known heat transport device may be used without any particular limitation as long as the heat transport device uses the heat transport fluid of the present invention as described above instead of a conventionally known heat transport fluid. There is for example a heat transport device (see FIG. 1) including: a circulation flow passage 3 through which a heat transport fluid (a base fluid 1 and solid particles 2) circulates; a pump P which causes the heat transport fluid to flow through the circulation flow passage 3; a heat absorption portion 5 (for example, a jacket portion of an engine) for absorbing heat from an external high-temperature region 4 (for example, the engine); and a heat dissipation portion 7 (for example, a radiator) for dissipating heat to an external low-temperature region 6. The heat transport device of the present invention may include a storage tank 8 for storing the heat transport fluid as necessary.

Figure 1:
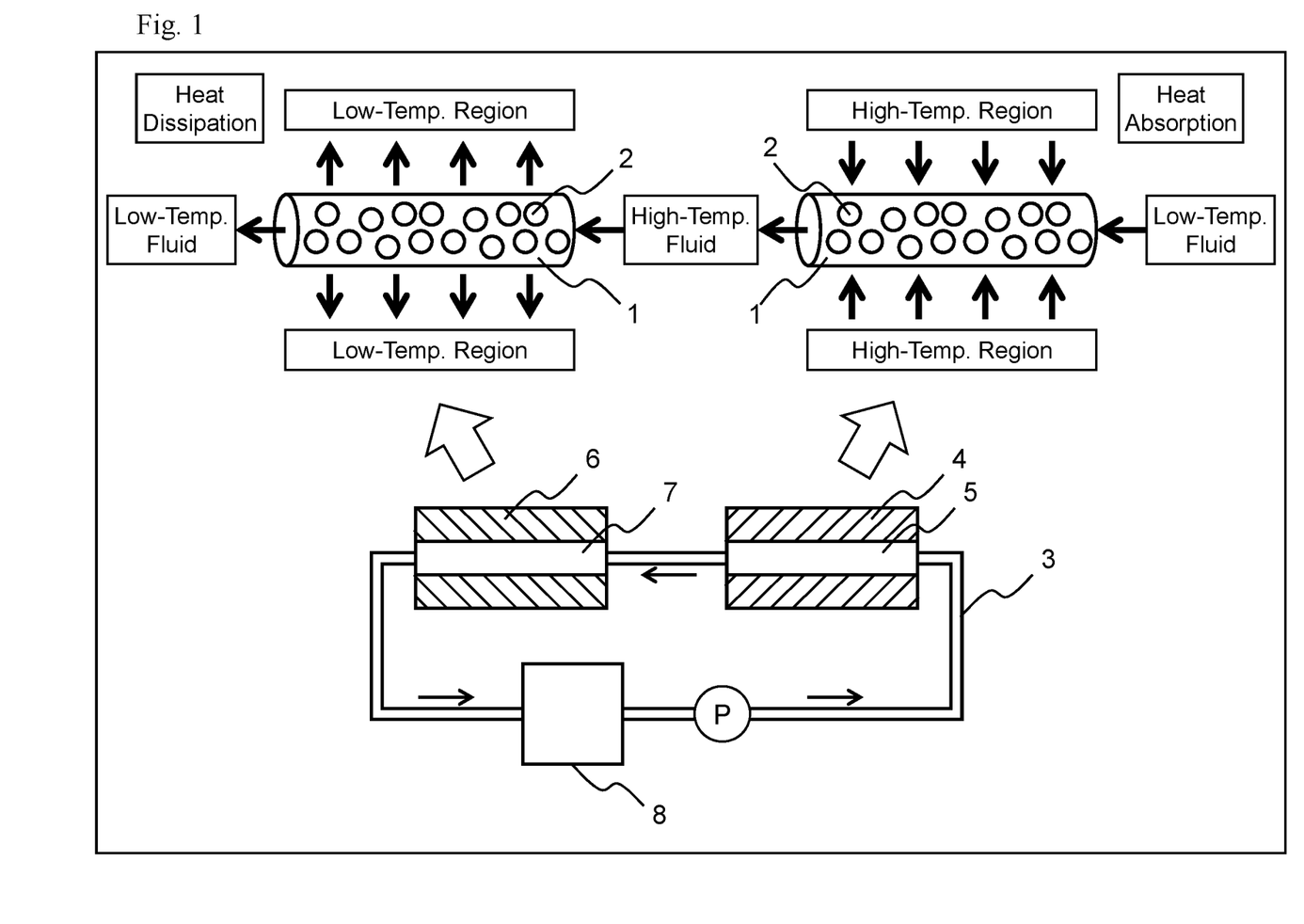
FIG. 1 is a schematic diagram showing an example of a heat transport device of the present invention.

In the heat transport device shown in FIG. 1, the heat transport fluid stored in the storage tank 8 is caused to flow (circulate) through the circulation flow passage 3 by using the pump P. In this event, when passing through the heat absorption portion 5, the heat transport fluid absorbs (receives) heat from the external high-temperature region 4. When passing through the heat dissipation portion 7, the high-temperature heat transport fluid that has absorbed heat dissipates heat to the external low-temperature region 6. The heat transport fluid that has dissipated heat is transferred to the storage tank 8 and again circulates through the circulation flow passage 3.

Such heat transport device includes, for example, heat source cooling systems of movable bodies (such as cooling systems of automobile engines and inverter cooling systems of hybrid vehicles (HVs) and electric vehicles (EVs)), cooling systems of various communication devices, and the like.

Although the preferred embodiment of the heat transport device of the present invention has been described so far, the heat transport device of the present invention is not limited to the above-described embodiment. For example, the external high-temperature region in the heat absorption portion 5 is not limited to a high-temperature solid such as an engine, but may be a heat medium such as a high-temperature liquid or gas. In addition, the external low-temperature region in the heat dissipation portion 7 is not limited to a low-temperature gas such as cooling air, but may be a liquid cooling medium such as cooling water.

EXAMPLES

Hereinafter, the present invention is described in further detail based on Examples and Comparative Examples; however, the present invention is not limited to Examples described below.

Example 1

A heat transport fluid was prepared by using an aqueous solution of ethylene glycol having a ethylene glycol concentration of 50% by mass (density (80° C.): 1004 kg/m$^3$, thermal conductivity (80° C.): 0.41 W/(m·K), specific heat (80° C.): 3.65 kJ/(kg·K)) as a base fluid, and adding spherical silica fine particles having a particle diameter of 300 nm ("KE-P30" manufactured by Nippon Shokubai Co., Ltd., true density: 2000 kg/m$^3$, refractive index: 1.43, thermal conductivity: 1.30 W/(m·K), and specific heat: 0.77 kJ/(kg·K)) to the base fluid such that the particle concentration became 3.63% by volume.

Example 2

A heat transport fluid was prepared in the same manner as that in Example 1 except that spherical silica fine particles having a particle diameter of 200 nm ("KE-P20" manufactured by Nippon Shokubai Co., Ltd., true density: 2000 kg/m$^3$, refractive index: 1.43, thermal conductivity: 1.30 W/(m·K), and specific heat: 0.77 kJ/(kg·K)) were added such that the particle concentration became 3.63% by volume instead of the spherical silica fine particles having a particle diameter of 300 nm.

Example 3

A heat transport fluid was prepared in the same manner as that in Example 1 except that the spherical silica fine particles were added such that the particle concentration became 1.01% by volume.

Example 4

A heat transport fluid was prepared in the same manner as that in Example 1 except that the spherical silica fine particles were added such that the particle concentration became 2.56% by volume.

Example 5

A heat transport fluid was prepared in the same manner as that in Example 1 except that the spherical silica fine particles were added such that the particle concentration became 5.26% by volume.

Example 6

A heat transport fluid was prepared in the same manner as that in Example 1 except that zirconia fine particles having a particle diameter of 200 nm ("NP-ZRO-2-2" manufactured by EMJapan Co., Ltd., true density: 5680 kg/m$^3$, thermal conductivity: 3.0 W/(m·K), and specific heat: 0.47 kJ/(kg·K)) were added such that the particle volume became 3.63% by volume instead of the spherical silica fine particles.

Example 7

A heat transport fluid was prepared in the same manner as that in Example 1 except that an aqueous solution of propylene glycol having a propylene glycol concentration of 50% by mass (density (80° C.): 982 kg/m$^3$, thermal conductivity (80° C.): 0.373 W/(m·K), specific heat (80° C.): 3.79 kJ/(kg·K)) was used as a base fluid.

Comparative Example 1

An aqueous solution of ethylene glycol having an ethylene glycol concentration of 50% by mass was used as a heat transport fluid without adding any solid particle.

Comparative Example 2

A heat transport fluid was prepared in the same manner as that in Example 1 except that spherical silica fine particles having a particle diameter of 100 nm ("KE-P10" manufactured by Nippon Shokubai Co., Ltd., true density: 2000 kg/m$^3$, refractive index: 1.43, thermal conductivity: 1.30 W/(m·K), and specific heat: 0.77 kJ/(kg·K)) were added such that the particle concentration became 3.63% by volume instead of the spherical silica fine particles having a particle diameter of 300 nm.

Comparative Example 3

A heat transport fluid was prepared in the same manner as that in Example 1 except that spherical silica fine particles having a particle diameter of 500 nm ("KE-P50" manufactured by Nippon Shokubai Co., Ltd., true density: 2000 kg/m$^3$, refractive index: 1.43, thermal conductivity: 1.30 W/(m·K), and specific heat: 0.77 kJ/(kg·K)) were added such that the particle concentration became 3.63% by volume instead of the spherical silica fine particles having a particle diameter of 300 nm.

Comparative Example 4

A heat transport fluid was prepared in the same manner as that in Example 1 except that spherical silica fine particles having a particle diameter of 1000 nm ("KE-P100" manufactured by Nippon Shokubai Co., Ltd., true density: 2000 kg/m$^3$, refractive index: 1.43, thermal conductivity: 1.30 W/(m·K), and specific heat: 0.77 kJ/(kg·K)) were added such that the particle concentration became 3.63% by volume instead of the spherical silica fine particles having a particle diameter of 300 nm.

Comparative Example 5

A heat transport fluid was prepared in the same manner as that in Example 1 except that alumina fine particles having a particle diameter of 300 nm ("NP-ALO-4" manufactured by EMJapan Co., Ltd., true density: 3950 kg/m$^3$, thermal conductivity: 31.0 W/(m·K), and specific heat: 0.77 kJ/(kg·K)) were added such that the particle volume became 3.63% by volume instead of the spherical silica fine particles.

Comparative Example 6

A heat transport fluid was prepared in the same manner as that in Example 1 except that titania fine particles having a particle diameter of 300 nm ("NP-TIO2-13" manufactured by EMJapan Co., Ltd., true density: 4260 kg/m$^3$, thermal conductivity: 4.0 W/(m·K), and specific heat: 0.71 kJ/(kg·K)) were added such that the particle volume became 3.63% by volume instead of the spherical silica fine particles.

<Measurement of Zeta Potential and Average Particle Diameter>

Figure 2:
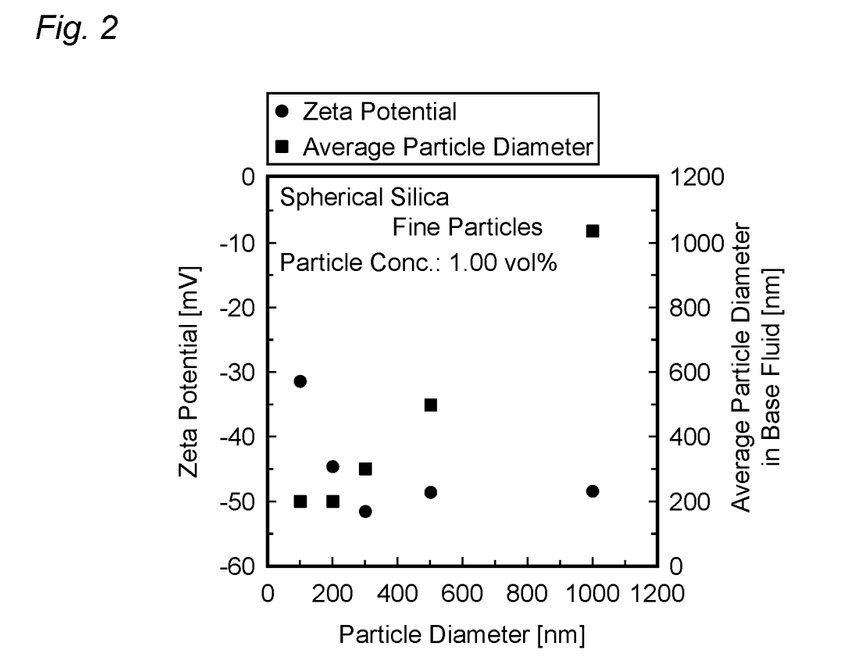
FIG. 2 is a graph showing a relationship between a particle diameter of spherical silica fine particles and a zeta potential as well as an average particle diameter in a base fluid.
Figure 3:
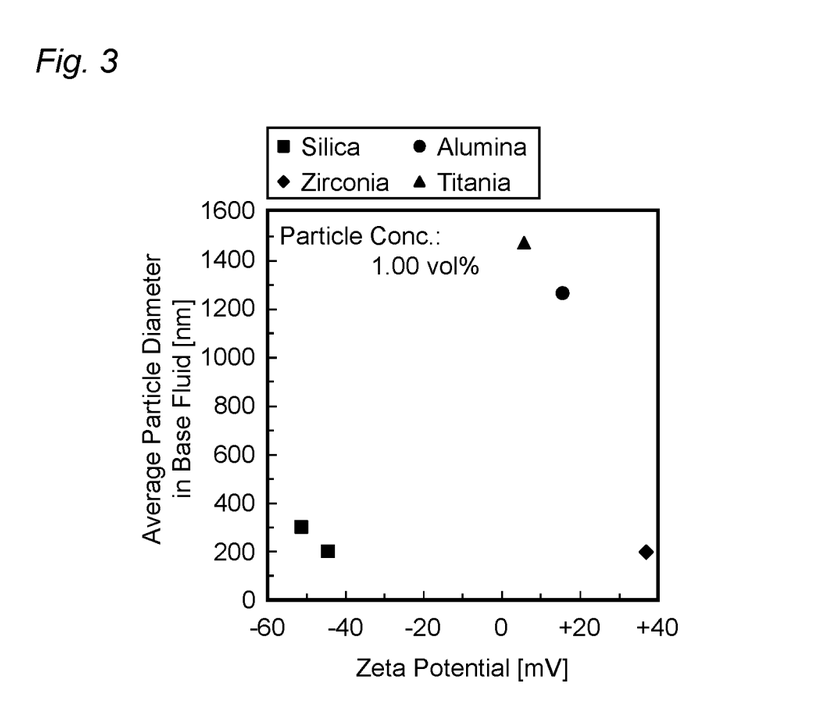
FIG. 3 is a graph showing a relationship between zeta potentials and average particle diameters of various solid particles in a base fluid.
Figure 4:
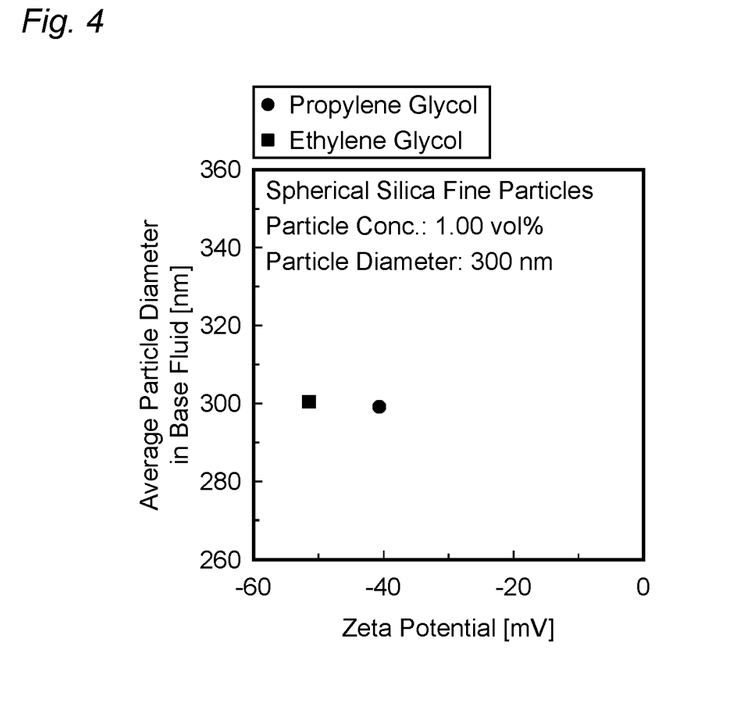
FIG. 4 is a graph showing a relationship between zeta potentials and average particle diameters of spherical silica fine particles in various base fluids.

The heat transport fluids obtained in Examples 1 to 2, 6 to 7 and Comparative Examples 2 to 6 were each diluted with the same base fluid which was used in each of Examples and Comparative Examples such that the particle concentration became 1.00% by volume. The zeta potential and the average particle diameter of the solid particles in the diluted heat transport fluid were measured at room temperature (25° C.) by using "Zetasizer Nano ZSP" manufactured by Malvern Instruments Ltd. Table 1 and FIG. 2 show the zeta potential and the average particle diameter of the spherical silica fine particles of each particle diameter in the heat transport fluid (Examples 1 to 2 and Comparative Examples 2 to 4, particle concentration: 1.00% by volume). In addition, Table 2 and FIG. 3 show the zeta potential and the average particle diameter of each of various solid particles in the heat transport fluid (Examples 1 to 2, 6, and Comparative Examples 5 to 6, particle concentration: 1.00% by volume). Moreover, Table 3 and FIG. 4 show the zeta potential and the average particle diameter of the spherical silica fine particles in each of various base fluids (Examples 1 and 7, particle concentration: 1.00% by volume).

TABLE 1

| | Particle Diameter [nm] | Zeta Potential [mV] | Average Particle Diameter in Heat Transport Fluid [nm] |
|---|---|---|---|
| Comp. Ex. 2 | 100 | −31.5 | 198.9 |
| Ex. 2 | 200 | −44.7 | 200.3 |
| Ex. 1 | 300 | −51.5 | 300.5 |
| Comp. Ex. 3 | 500 | −48.6 | 496.2 |
| Comp. Ex. 4 | 1000 | −48.5 | 1031 |

Spherical Silica Fine Particles, Particle Concentration: 1.00 vol %

As shown in Table 1 and FIG. 2, it was found that when the spherical silica fine particles having a particle diameter of 200 nm or more were added to the base fluid, the absolute value of the zeta potential (the potential difference from the base fluid) became 40 mV or more, which was larger than that of the case where the spherical silica fine particles having a particle diameter of 100 nm were added (the potential difference from the base fluid: about 30 mV). In addition, it was found that when the spherical silica fine particles having a particle diameter of approximately 300 nm were added, the potential difference from the base fluid became the maximum. Moreover, it was confirmed that the spherical silica fine particles having a particle diameter of 200 nm or more were monodispersed in the aqueous solution of ethylene glycol whereas the spherical silica fine particles having a particle diameter of 100 nm had an increased average particle diameter and thus aggregated in the aqueous solution of ethylene glycol.

TABLE 2

| | Solid Particles | Zeta Potential [mV] | Average Particle Diameter in Heat Transport Fluid [nm] |
|---|---|---|---|
| Ex. 1 | Silica | −51.5 | 300.5 |
| Ex. 2 | Silica | −44.7 | 200.3 |
| Ex. 6 | Zirconia | +36.9 | 196.0 |
| Comp. Ex. 5 | Alumina | +15.4 | 1260 |
| Comp. Ex. 6 | Titania | +5.6 | 1466 |

Particle Concentration: 1.00 vol %

In addition, as shown in Table 2 and FIG. 3, it was found that when the zirconia fine particles having a particle diameter of 200 nm were added to the base fluid, the absolute value of the zeta potential (the potential difference from the base fluid) became 36.9 mV. Moreover, it was confirmed that the zirconia fine particles having a particle diameter of 200 nm were monodispersed in the aqueous solution of ethylene glycol like the spherical silica fine particles having a particle diameter of 200 to 300 nm. On the other hand, it was found that the alumina fine particles and the titania fine particles having a particle diameter of 300 nm had an increased average particle diameter and thus aggregated in the aqueous solution of ethylene glycol. This is conceivably because the alumina fine particles and the titania fine particles having a particle diameter of 300 nm have smaller potential differences from the base fluid, and thus have stronger aggregation properties, than the spherical silica fine particles having a particle diameter of 200 to 300 nm and the zirconia fine particles having a particle diameter of 200 nm.

TABLE 3

|  | Base Fluid | Zeta Potential [mV] | Average Particle Diameter in Heat Transport Fluid [nm] |
| --- | --- | --- | --- |
| Ex. 1 | Ethylene Glycol | −51.5 | 300.5 |
| Ex. 7 | Propylene Glycol | −40.7 | 299.2 |

Spherical Silica Fine Particles, Particle Concentration: 1.00 vol %

In addition, as shown in Table 3 and FIG. 4, it was confirmed that when the spherical silica fine particles having a particle diameter of 300 nm were added to the aqueous solution of propylene glycol as well, the absolute value of the zeta potential (the potential difference from the base fluid) became 40 mV or more as in the case where the spherical silica fine particles having a particle diameter of 300 nm were added to the aqueous solution of ethylene glycol. Moreover, it was confirmed that the spherical silica fine particles having a particle diameter of 300 nm were monodispersed also in the aqueous solution of propylene glycol.

From the above-described results, it was found that by selecting solid particles and a base fluid such that the absolute value of the zeta potential (the potential difference from the base fluid) became 35 mV or more, it was possible to obtain a heat transport material having the solid particles monodispersed in the base fluid.

<Measurement of Thermal Conductivity>

Figure 5:
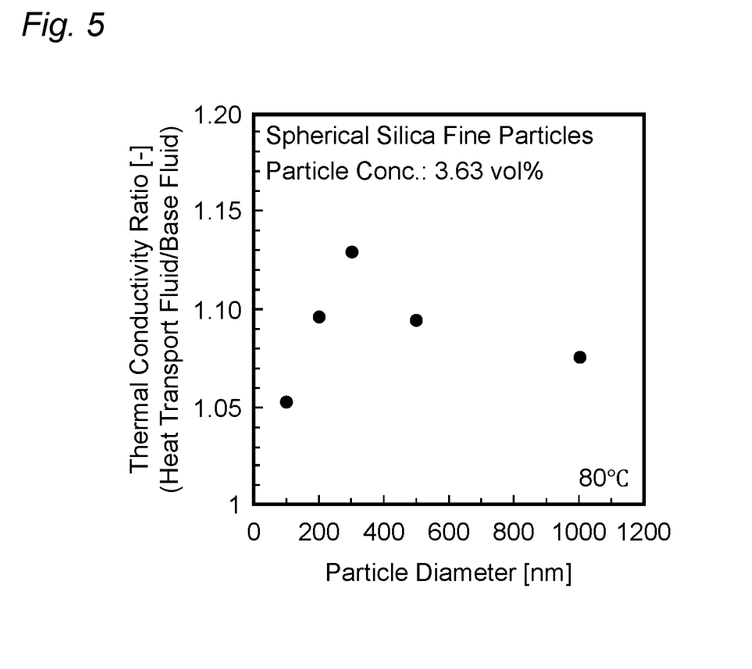
FIG. 5 is a graph showing a relationship between a particle diameter of a spherical silica fine particle and a thermal conductivity of a heat transport fluid (relative to a base fluid).
Figure 6:
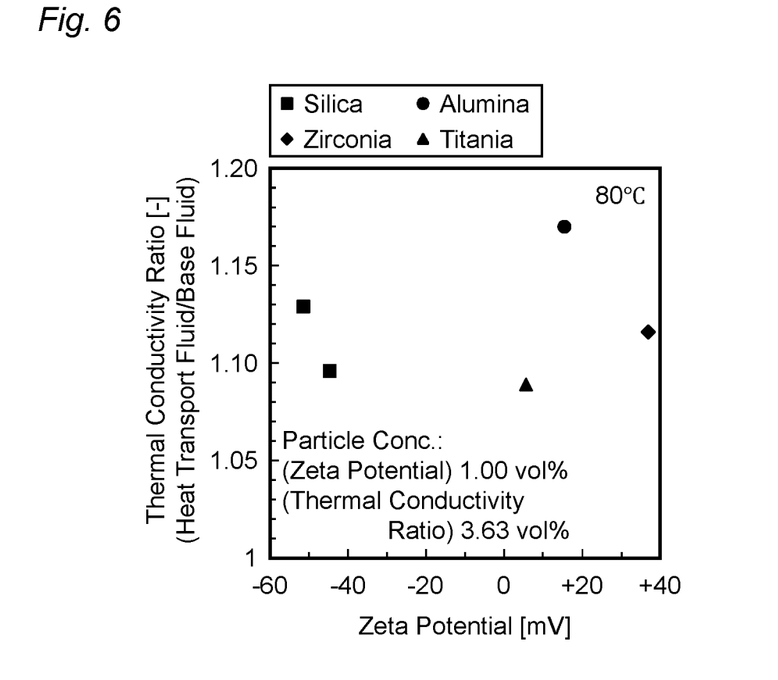
FIG. 6 is a graph showing a relationship between zeta potentials of various solid particles in a base fluid and thermal conductivities of heat transport fluids (relative to the base fluid).
Figure 7:
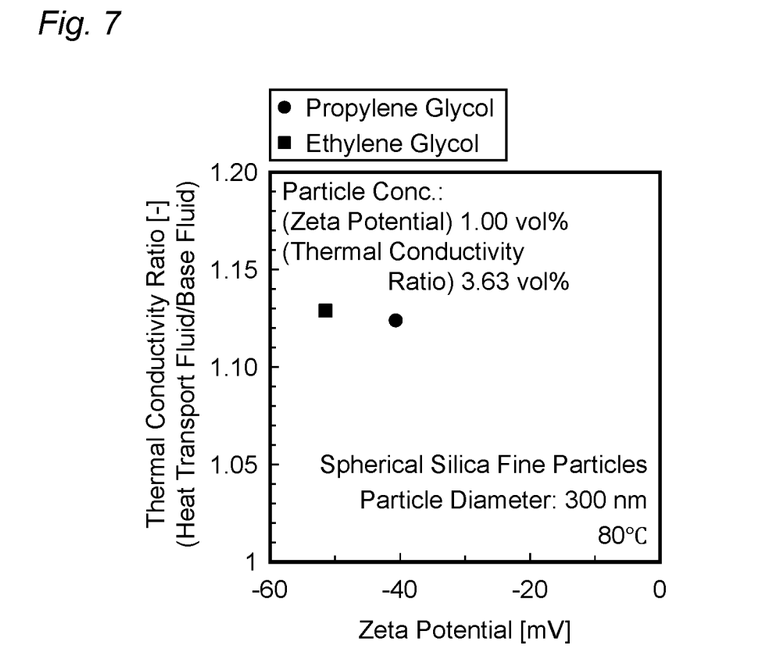
FIG. 7 is a graph showing a relationship between zeta potentials of spherical silica fine particles in various base fluids and thermal conductivities of heat transport fluids (relative to the base fluids).

The thermal conductivities of the heat transport fluids obtained in Examples 1 to 2, 6 to 7, and Comparative Examples 1 to 6 were measured at 80° C. using "Nanoflash LFA447" manufactured by NETZSCH GmbH, and ratios of the thermal conductivities of the heat transport fluids (Examples 1 to 2, 6 to 7, and Comparative Examples 2 to 6) to the thermal conductivity of the base fluid (Comparative Example 1) were obtained. Table 4 and FIG. 5 show the thermal conductivity ratios (heat transport fluid/base fluid) of the heat transport fluids containing spherical silica fine particles having the respective particle diameters (Examples 1 to 2 and Comparative Examples 2 to 4, particle concentration: 3.63% by volume). In addition, Table 5 and FIG. 6 show the thermal conductivity ratios (heat transport fluid/base fluid) of the heat transport fluids containing various solid particles (Examples 1 to 2, 6, and Comparative Examples 5 to 6, particle concentration: 3.63% by volume). Moreover, Table 6 and FIG. 7 show the thermal conductivity ratios (heat transport fluid/base fluid) of the heat transport fluids containing various base fluids and spherical silica fine particles (Examples 1 and 7, particle concentration: 3.63% by volume).

TABLE 4

|  | Particle Diameter [nm] | Thermal Conductivity Ratio [-] (Heat Transport Fluid/Base Fluid) |
| --- | --- | --- |
| Comp. Ex. 2 | 100 | 1.052 |
| Ex. 2 | 200 | 1.096 |
| Ex. 1 | 300 | 1.129 |
| Comp. Ex. 3 | 500 | 1.094 |
| Comp. Ex. 4 | 1000 | 1.075 |

Spherical Silica Fine Particles, Particle Concentration: 3.63 vol %

As shown in Table 4 and FIG. 5, it was found that when the spherical silica fine particles having a particle diameter of 200 to 400 nm were added to the base fluid, the thermal conductivity became 1.096 times or more that of the base fluid, which was larger than those of the case where the spherical silica fine particles having a particle diameter of 100 nm were added (the thermal conductivity was 1.052 times that of the base fluid) and the case where the spherical silica fine particles having a particle diameter of 1000 nm were added (the thermal conductivity was 1.075 times that of the base fluid). In addition, it was found that when the spherical silica fine particles having a particle diameter of approximately 300 nm were added, the thermal conductivity became the maximum.

TABLE 5

|  | Solid Particles | Zeta Potential [mV] | Thermal Conductivity Ratio [-] (Heat Transport Fluid/Base Fluid) |
| --- | --- | --- | --- |
| Ex. 1 | Silica | −51.5 | 1.129 |
| Ex. 2 | Silica | −44.7 | 1.096 |
| Ex. 6 | Zirconia | +36.9 | 1.116 |
| Comp. Ex. 5 | Alumina | +15.4 | 1.170 |
| Comp. Ex. 6 | Titania | +5.6 | 1.089 |

Particle Concentration: (Zeta Potential) 1.00 vol %
(Thermal Conductivity Ratio) 3.63 vol %

In addition, as shown in Table 5 and FIG. 6, it was confirmed that when the zirconia fine particles were added such that the absolute value of the zeta potential (the potential difference from the base fluid) became 35 mV or more as well, the thermal conductivity became higher (1.116 times that of the base fluid), as in the case where the spherical silica fine particles were added such that the absolute value of the zeta potential (the potential difference from the base fluid) became 35 mV or more. On the other hand, when the absolute value of the zeta potential (the potential difference from the base fluid) became less than 35 mV, the thermal conductivity was not sufficiently improved (1.089 times that of the base fluid). Note that when the alumina fine particles having a particle diameter of 300 nm were added, although the absolute value of the zeta potential (the potential difference from the base fluid) became less than 35 mV, the thermal conductivity was improved. This is conceivably because the thermal conductivity of the alumina fine particles themselves is quite higher than the thermal conductivities of the spherical silica fine particle and the zirconia fine particles.

TABLE 6

|  | Base Fluid | Zeta Potential [mV] | Thermal Conductivity Ratio [-] (Heat Transport Fluid/Base Fluid) |
| --- | --- | --- | --- |
| Ex. 1 | Ethylene Glycol | −51.5 | 1.129 |
| Ex. 7 | Propylene Glycol | −40.7 | 1.124 |

Spherical Silica Fine Particles
Particle Concentration: (Zeta Potential) 1.00 vol %
(Thermal Conductivity Ratio) 3.63 vol %

In addition, as shown in Table 6 and FIG. 7, it was confirmed that when the spherical silica fine particles having a particle diameter of 300 nm were added to the aqueous solution of propylene glycol as well, it was possible to obtain a heat transport material having as high a thermal conductivity as that of the case where the spherical silica fine particles having a particle diameter of 300 nm were added to the aqueous solution of ethylene glycol.

From the above-described results, it was found that by selecting solid particles and a base fluid such that the absolute value of the zeta potential (the potential difference from the base fluid) became 35 mV or more, it was possible to obtain a heat transport material having a high thermal conductivity.

<Measurement of Heat Transfer Coefficient>

Figure 8:
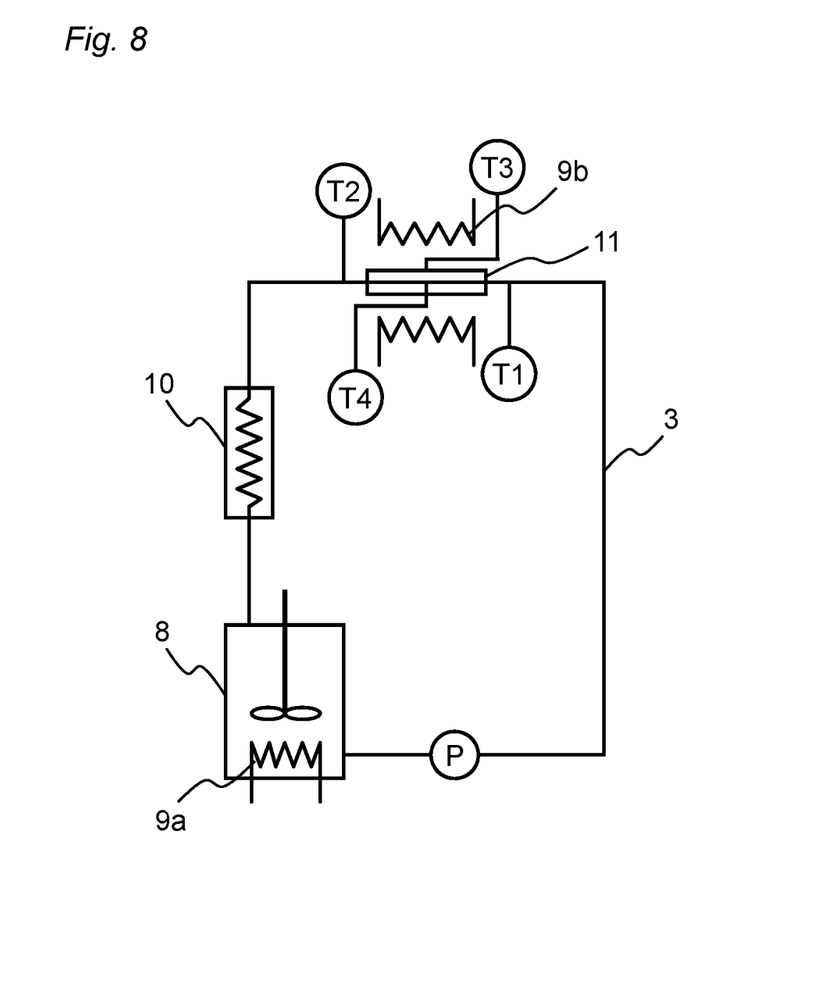
FIG. 8 is a schematic diagram showing a heat transport device used to measure a heat transfer coefficient of a heat transport fluid in Examples.

The heat transfer coefficient was measured for each of the heat transport fluids obtained in Examples 1 to 7 and Comparative Examples 1 to 6 by using a heat transport device shown in FIG. 8. Specifically, the heat transport fluid was sealed in the storage tank 8, and was caused to circulate at a flow rate of 2 m/s in the circulation flow passage 3 by using the pump P. The heat transport fluid in the storage tank 8 was heated to 80° C. by using a heater 9a. In addition, the heat transport fluid was heated by using a heater 9b with an output of 1.7 kW. In this event, a cooling water at room temperature (20° C.) was caused to circulate through the heat exchanger 10 to cool down the heat transport fluid, so that the inlet temperature: $T_{IN}$ of the measurement portion 11 was adjusted to be 80° C. Once the inlet temperature: $T_{IN}$ and the outlet temperature: $T_{OUT}$ of the measurement portion 11, and the flow rate: F of the heat transport fluid became stationary, the inlet temperature: $T_{IN}$ and the outlet temperature: $T_{OUT}$ of the measurement portion 11 were measured by using thermocouple T1 and T2, and further, the wall surface temperature: $T_{Wall}$ of the measurement portion 11 and the temperature: $T_{Fluid}$ of the heat transport fluid were also measured by using thermocouple T3 and T4. From the inlet temperature: $T_{IN}$ (K) and the outlet temperature: $T_{OUT}$ (K) of the measurement portion 11 as well as the flow rate: F (m³/s) of the heat transport fluid thus obtained, the heat input: $Q_{IN}$ (kW) of the heat transport fluid in the measurement portion 11 was calculated using the following equation:

$$Q_{IN}=\rho C_p F(T_{OUT}-T_{IN})$$

where ρ represents the density (kg/m³) of the heat transport fluid and $C_p$ represents the specific heat (kJ/(kg·K)).

Figure 9:
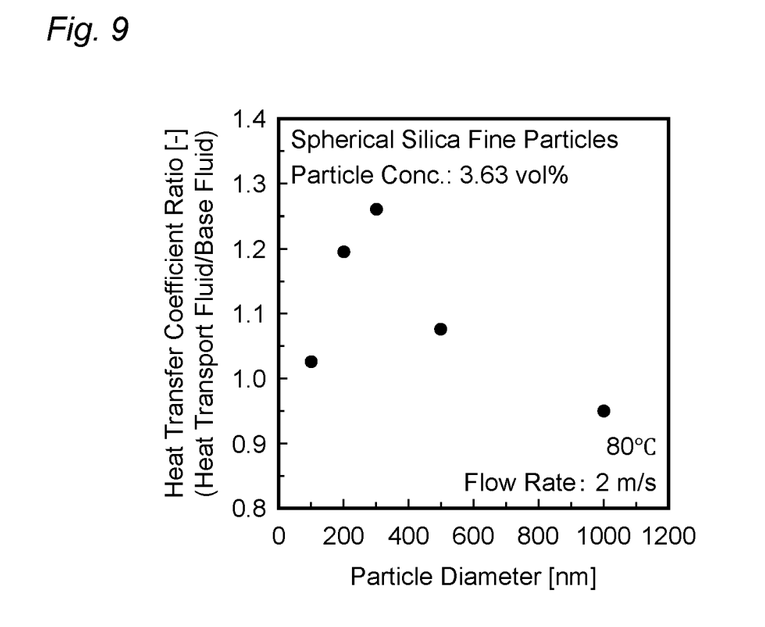
FIG. 9 is a graph showing a relationship between a particle diameter of spherical silica fine particles and a heat transfer coefficient of a heat transport fluid (relative to the base fluid).
Figure 10:
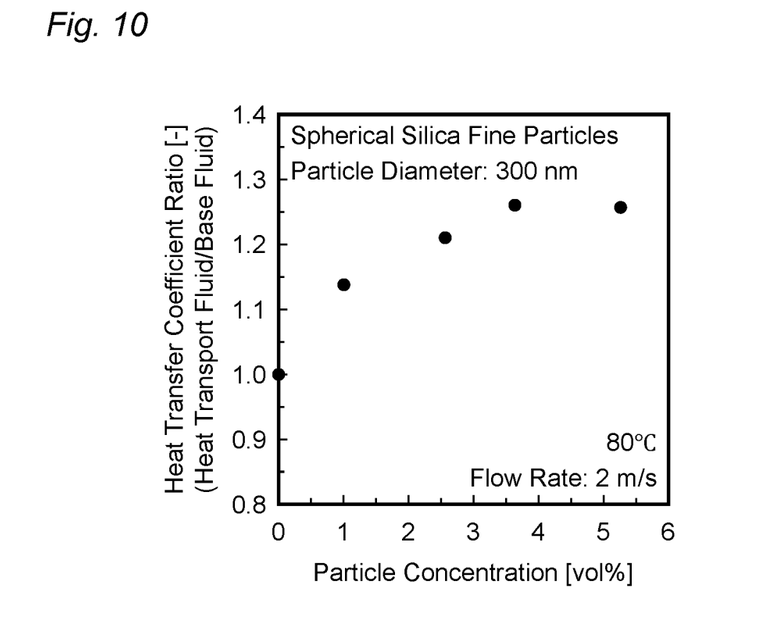
FIG. 10 is a graph showing a relationship between a concentration of spherical silica fine particles and a heat transfer coefficient of a heat transport fluid (relative to the base fluid).
Figure 11:
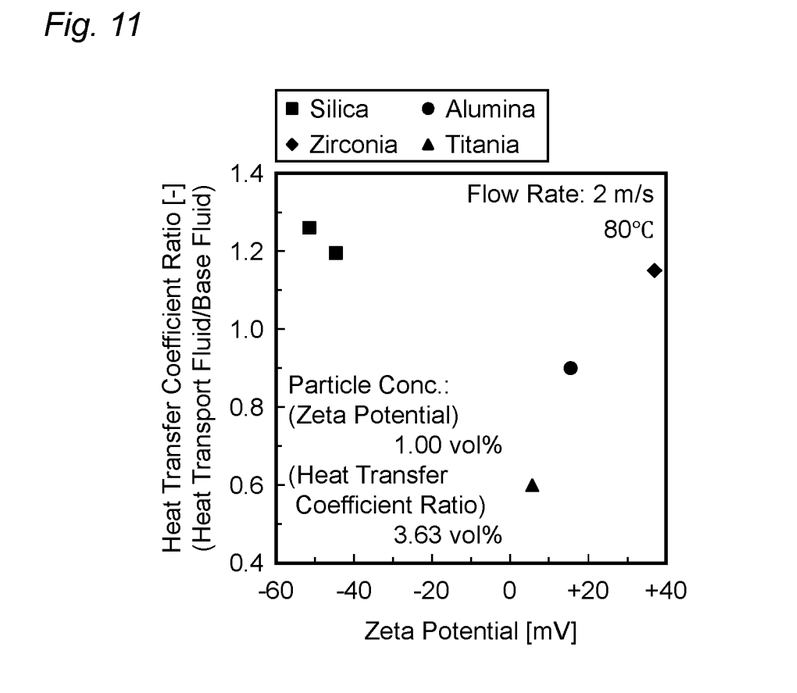
FIG. 11 is a graph showing a relationship between zeta potentials of various solid particles in a base fluid and heat transfer coefficients of heat transport fluids (relative to the base fluid).
Figure 12:
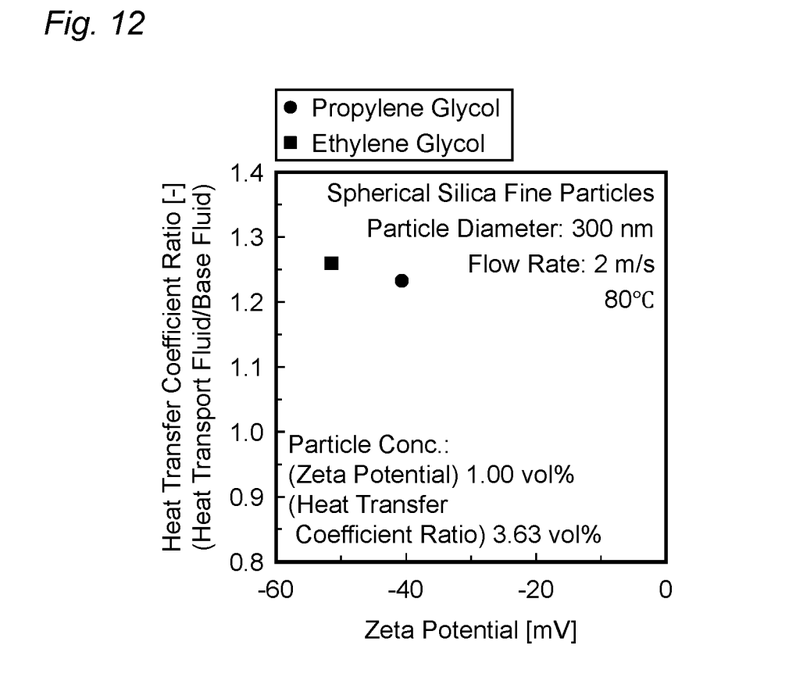
FIG. 12 is a graph showing a relationship between zeta potentials of spherical silica fine particles in various base fluids and heat transfer coefficients of heat transport fluids (relative to the base fluids).

From the obtained heat input: $Q_{IN}$ (kW) of the heat transport fluid, the wall surface temperature: $T_{Wall}$ (K) of the measurement portion 11, and the temperature: $T_{Fluid}$ (K) of the heat transport fluid, the heat transfer coefficient: h (W/(m²·K)) was calculated using the following equation:

$$h=1000\times Q_{IN}/(A_{Wall}\times(T_{Wall}-T_{Fluid}))$$

where $A_{Wall}$ represents the area (m²) of the internal surface of the measurement portion 11. Then, the ratio of the heat transfer coefficient of each of the heat transport fluids (Examples 1 to 7 and Comparative Examples 2 to 6) to the heat transfer coefficient of the base fluid (Comparative Example 1) was obtained. Table 7 and FIG. 9 show the heat transfer coefficient ratios (heat transport fluid/base fluid) of heat transport fluids containing the spherical silica fine particles having the respective particle diameters (Examples 1 to 2 and Comparative Examples 2 to 4, particle concentration: 3.63% by volume). In addition, Table 8 and FIG. 10 show the heat transfer coefficient ratios (heat transport fluid/base fluid) of the heat transport fluids containing the spherical silica fine particles having the respective particle concentrations (Examples 1, 3 to 5, and Comparative Example 1, particle diameter: 300 nm). Moreover, Table 9 and FIG. 11 show the heat transfer coefficient ratios (heat transport fluid/base fluid) of the heat transport fluids containing various solid particles (Examples 1 to 2, 6, and Comparative Examples 5 to 6, particle concentration: 3.63% by volume). In addition, Table 10 and FIG. 12 show the heat transfer coefficient ratios (heat transport fluid/base fluid) of the heat transport fluid containing various base fluids and spherical silica fine particles (Examples 1 and 7, particle concentration: 3.63% by volume).

TABLE 7

|  | Particle Diameter [nm] | Heat Transfer Coefficient Ratio [-] (Heat Transport Fluid/Base Fluid) |
|---|---|---|
| Comp. Ex. 2 | 100 | 1.025 |
| Ex. 2 | 200 | 1.195 |
| Ex. 1 | 300 | 1.260 |
| Comp. Ex. 3 | 500 | 1.075 |
| Comp. Ex. 4 | 1000 | 0.950 |

Spherical Silica Fine Particles, Particle Concentration: 3.63 vol %

As shown in Table 7 and FIG. 9, it was found that when the spherical silica fine particles having a particle diameter of 200 to 400 nm were added to the base fluid, the heat transfer coefficient became about 1.15 times or more that of the base fluid, which was larger than that of the case where the spherical silica fine particles having a particle diameter of 100 nm were added (the heat transfer coefficient was 1.025 times that of the base fluid), that of the case where the spherical silica fine particles having a particle diameter of 500 nm were added (the heat transfer coefficient was 1.075 times that of the base fluid), and that of the case where the spherical silica fine particles having a particle diameter of 1000 nm were added (the heat transfer coefficient was 0.950 times that of the base fluid), so that the heat transfer efficiency was improved. In addition, when the spherical silica fine particles having a particle diameter of approximately 300 nm were added, the heat transfer coefficient became the maximum.

TABLE 8

|  | Particle Concentration [vol %] | Heat Transfer Coefficient Ratio [-] (Heat Transport Fluid/Base Fluid) |
|---|---|---|
| Comp. Ex. 1 | 0 | 1 |
| Ex. 3 | 1.01 | 1.137 |
| Ex. 4 | 2.56 | 1.211 |
| Ex. 1 | 3.63 | 1.260 |
| Ex. 5 | 5.26 | 1.257 |

Spherical Silica Fine Particles, Particle Diameter: 300 nm

In addition, as shown in Table 8 and FIG. 10, it was found that when the concentration of the spherical silica fine particle in the heat transport fluid was increased, the heat transfer coefficient increased and the heat transfer efficiency was improved. It was also found that when the spherical silica fine particles were added to the base fluid such that the particle concentration became 1.0% by volume or more, the heat transfer coefficient became about 1.14 times or more that of the base fluid, and once the particle concentration became 3.6% by volume or more, the heat transfer coefficient became substantially constant at about 1.26 times that of the base fluid.

TABLE 9

| | Solid Particles | Zeta Potential [mV] | Heat Transfer Coefficient Ratio [-] (Heat Transport Fluid/Base Fluid) |
|---|---|---|---|
| Ex. 1 | Silica | −51.5 | 1.260 |
| Ex. 2 | Silica | −44.7 | 1.195 |
| Ex. 6 | Zirconia | +36.9 | 1.150 |
| Comp. Ex. 5 | Alumina | +15.4 | 0.900 |
| Comp. Ex. 6 | Titania | +5.6 | 0.600 |

Particle Concentration: (Zeta Potential) 1.00 vol %
(Heat Transfer Coefficient Ratio) 3.63 vol %

In addition, as shown in Table 9 and FIG. 11, it was found that when the zirconia fine particles were added such that the absolute value of the zeta potential (the potential difference from the base fluid) became 35 mV or more as well, the heat transfer coefficient became higher (1.150 times that of the base fluid), as in the case where the spherical silica fine particles were added such that the absolute value of the zeta potential (the potential difference from the base fluid) became 35 mV or more. On the other hand, when the absolute value of the zeta potential (the potential difference from the base fluid) of the solid particles became less than 35 mV, the heat transfer coefficient became smaller than that of the base fluid (0.900 times or 0.600 times that of the base fluid), so that the heat transfer coefficient was not be able to be improved.

TABLE 10

| | Base Fluid | Zeta Potential [mV] | Heat Transfer Coefficient Ratio [-] (Heat Transport Fluid/Base Fluid) |
|---|---|---|---|
| Ex 1 | Ethylene Glycol | −51.5 | 1.260 |
| Ex 7 | Propylene Glycol | −40.7 | 1.233 |

Spherical Silica Fine Particles
Particle Concentration: (Zeta Potential) 1.00 vol %
(Heat Transfer Coefficient Ratio) 3.63 vol %

In addition, as shown in Table 10 and FIG. 12, it was confirmed that when the spherical silica fine particles having a particle diameter of 300 nm were added to the aqueous solution of propylene glycol as well, a heat transport material having as high a heat transfer coefficient, as that of the case where the spherical silica fine particles having a particle diameter of 300 nm were added to the aqueous solution of ethylene glycol.

From the above-described results, it was found that by selecting solid particles and a base fluid such that the absolute value of the zeta potential (the potential difference from the base fluid) became 35 mV or more (more preferably, 40 mV or more), it was possible to obtain a heat transport material having a high heat transfer coefficient.

As described so far, the present invention makes it possible to obtain a heat transport fluid more excellent in heat transfer efficiency.

The heat transport device of the present invention therefore makes it possible to transport thermal energy with a high heat exchange efficiency because of its use of a heat transport fluid excellent in heat transfer efficiency, and thus is useful as cooling devices for automobile engines and the like with reduction in pump power and further with improved fuel consumption, and the like.

REFERENCE SIGNS LIST

1: base fluid
2: solid particle
3: circulation flow passage
4: external high-temperature region
5: heat absorption portion
6: external low-temperature region
7: heat dissipation portion
8: storage tank
9a, 9b: heater
10: heat exchanger
11: measurement portion

What is claimed is:

1. A heat transport fluid comprising:
a base fluid; and
solid particles which are dispersed in the base fluid, wherein the solid particles prior to inclusion in the heat transport fluid have an average particle diameter of 200 to 400 nm, and the solid particles have a potential difference of 35 mV or more from the base fluid, wherein
a ratio of thermal conductivity of the heat transport fluid to that of the base fluid (heat transport fluid/base fluid) is 1.096 or more, and
a content of the solid particles is 1.0% by volume or more and 5.0% by volume or less relative to the entire heat transport fluid.

2. A heat transport device comprising the heat transport fluid according to claim 1.

3. The heat transport device according to claim 2, comprising:
a circulation flow passage through which the heat transport fluid circulates;
a pump which causes the heat transport fluid to flow through the circulation flow passage;
a heat absorption portion which causes the heat transport fluid to absorb heat from an external high-temperature region; and
a heat dissipation portion which dissipates heat from the heat transport fluid to an external low-temperature region.

4. The heat transport fluid according to claim 1, wherein the base fluid comprises at least one of water, ethylene photolockcrglycol glycol, or propylene glycol.

5. The heat transport fluid according to claim 1, wherein the base fluid comprises at least one of ethylene glycol or propylene glycol.

6. The heat transport fluid according to claim 1, wherein the base fluid is an aqueous solution of ethylene glycol or an aqueous solution propylene glycol.

7. The heat transport fluid according to claim 1, wherein the solid particles are at least one of particulate carbon materials, metal oxide particles, and metal particles.

8. The heat transport fluid according to claim 1, wherein the solid particles are at least one of graphite particles, diamond particles, silica particles, zirconia particles, alumina particles, ceramic particles, and copper particles.

9. The heat transport fluid according to claim 1, wherein the solid particles are at least one of silica particles and zirconia particles.

10. The heat transport fluid according to claim 1, wherein the base fluid comprises at least one of water, ethylene glycol, or propylene glycol and the solid particles are at least one of particulate carbon materials, metal oxide particles, and metal particles.

11. The heat transport fluid according to claim 1, wherein the solid particles are monodispersed in the base fluid.

* * * * *

UNITED STATES PATENT AND TRADEMARK OFFICE
CERTIFICATE OF CORRECTION

PATENT NO. : 11,091,680 B2  
APPLICATION NO. : 15/836983  
DATED : August 17, 2021  
INVENTOR(S) : Shunsuke Hashimoto et al.

Page 1 of 1

It is certified that error appears in the above-identified patent and that said Letters Patent is hereby corrected as shown below:

In the Claims

Column 14, Claim 4, Line 3, delete "photolockcrglycol".

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*